000# United States Patent Office 3,809,607
Patented May 7, 1974

3,809,607
REACTOR VESSEL IN-SERVICE INSPECTION ASSEMBLY
Thomas R. Murray, Munhall, and David C. Burns, Trafford, Pa., assignors to Westinghouse Electric Corporation, Pittsburgh, Pa.
Filed Nov. 23, 1971, Ser. No. 201,420
Int. Cl. G21c 17/00
U.S. Cl. 176—19 R
20 Claims

ABSTRACT OF THE DISCLOSURE

A nuclear reactor vessel in-service inspection assembly is provided for remotely, accurately positioning the inspection tool within the reactor vessel. The assembly has integral adjustment means whereby the tool is adapted to be used with a wide variety of vessel sizes. The inspection assembly is primarily adapted for ultrasonic, volumetric examination of the weld areas of the reactor vessel.

BACKGROUND OF THE INVENTION

Field of the invention

The present invention relates to an inspection system for nuclear reactor vessels.

State of the prior art

The standard nuclear reactor vessel used in commercial power generation, be it the pressurized water type or the boiling water type, utilizes a generally cylindrical metallic member which has a top flange welded thereto, with a plurality of nozzles extending through the vessel wall. Numerous welds are necessarily used in fabricating the vessel, in joining the flange to the cylindrical portion of the vessel, as well as in providing the inlet and outlet nozzles. While the reactor vessel is itself encased in a thick concrete containment area, the structural integrity of the reactor vessel is of critical importance.

The weld areas of the reactor vessel are of course inspected before the vessel is used, and in-service inspection of the vessel weld areas is desirable and required under recent governmental regulation. The regulation requires that pressure vessel weld areas be subjected to periodic, volumetric examination. The inspection unit designed to meet these requirements must thus be capable of operating in an underwater and radioactive environment with remote control operation, while maintaining a high degree of precision of placement and movement of the inspection tool.

A further complication in designing such inspection tools is the variety of reactor vessel sizes to which the tool should be adaptable.

The inspection assembly must be compatible with reactor vessels now in use and must be adaptable to the reactor vessels with minimum interference with normal refueling and maintenance operations.

The use of ultrasonic transducers to inspect metal welds is known, and such a system is described in the periodical Materials Evaluation, July 1970, volume 28, No. 7, pages 162–167. This article details a transmitter-receiver type ultrasonic inspection system for use in in-service inspection of nuclear reactor vessels. The positioning system for the transducers described in this article uses a track which is mounted on the vessel wall.

A method and apparatus for ultrasonic inspection of a pipe from within the pipe is disclosed in U.S. Pat. 3,584,504. In this apparatus the transducer array is mounted on a carrier which is rotatable with a central shaft of the apparatus.

SUMMARY OF THE INVENTION

A nuclear reactor vessel in-service inspection assembly is detailed which permits remote control, accurate positioning of a tool within the reactor vessel and comprises a positioning and support assembly comprising a central body portion from which a plurality of radially directed support arms extend. The extending ends of the support arms are adapted to seat on a predetermined portion of the reactor vessel to define a positional frame of reference for the inspection assembly relative to the reactor vessel. The repositioning and support assemblies include integral adjustment means whereby the radial extent of the support arms is simultaneously varied to permit the assembly to fit reactor vessels of varying diameter. A central column is connected to the positioning and support assembly which central column extends along the longitudinal axis thereof. One or more movable inspection assemblies are connected to the central column which inspection assemblies include drive means and position indicating means.

Three specific inspection subassemblies are provided including a flange scanner, a nozzle scanner, and a vessel scanner. Each of these scanner assemblies employ multi-probe transmitter-receiver ultrasonic transducers to permit more accurate volumetric plotting of the state of the wall of the vessel.

The particular design of the persent apparatus allows for ready adaptation of the inspection assembly to fit a variety of vessel sizes.

DESCRIPTION OF THE PREFERRED EMBODIMENTS

Figure 1:
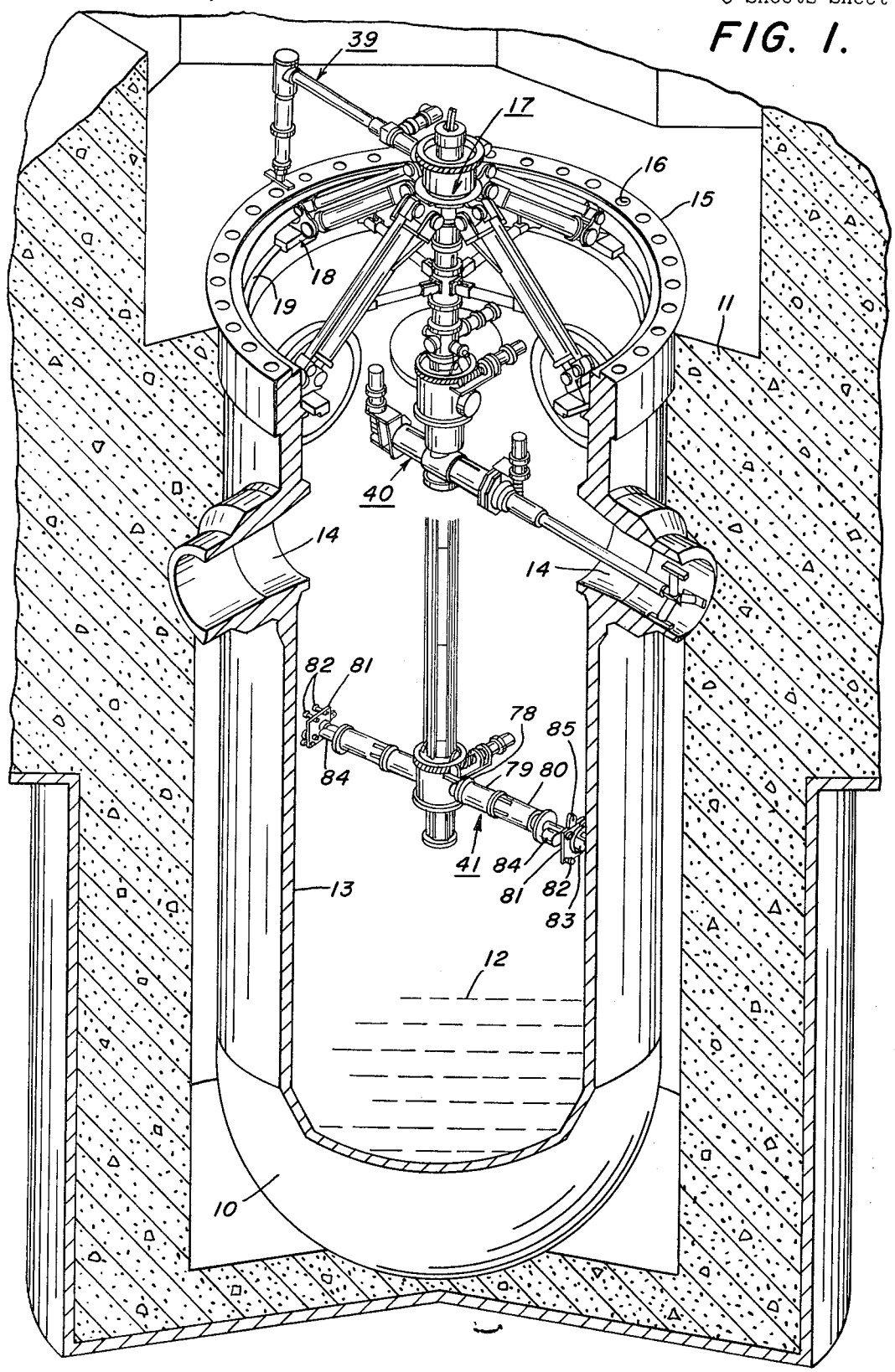
FIG. 1 is a composite perspective view of the in-service inspection assembly of the present invention in place in a reactor vessel, illustrating both the nozzle scanner and vessel scanner in place.
Figure 2:
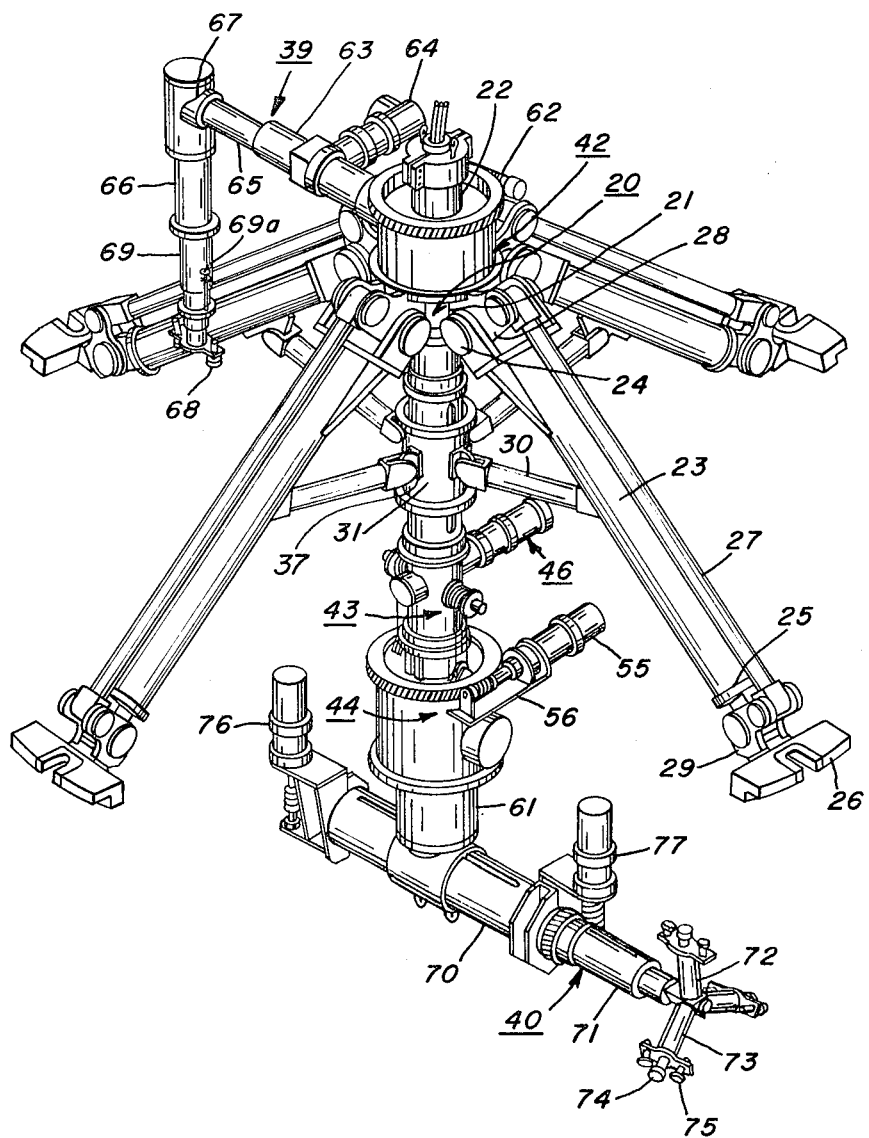
FIG. 2 is a side perspective of the inspection assembly of the present invention.

The invention can be best understood by reference to the exemplary embodiments shown in the drawings. In FIG. 1, a nuclear reactor vessel 10 is shown in place within concrete encasement 11. The concrete encasement 11 surrounds and encompasses the bottom portion of the reactor vessel, while the top portion of the concrete encasement defines a means of providing a pool of water 12 within and above the reactor vessel. The reactor vessel 10 comprises a generally cylindrical shell portion 13 having a plurality of inlet and outlet nozzles 14 extending through the side walls thereof. A sealing flange 15 is disposed at the upper end of the cylindrical shell portion 13. A plurality of bolt holes 16 are provided in the sealing flange which bolt holes 16 permit sealing of the reactor vessel by means of a header, not shown. The in-service inspection assembly 17 is shown in place supported by the reactor vessel. FIG. 1 is a composite view showing the inspection assembly 17 fitted for two different modes of operation, nozzle scanning and vessel wall scanning. These operations are carried out at different times with either the nozzle scanning assembly in place as shown in FIG. 2, or with the nozzle scanner removed, and the vessel scanner mounted about the extending central column. The inspection assembly 17 is mounted upon and supported by the accurately positioned key ways 18 provided in the reactor vessel internal support flange 19. The key ways 18 provide a very accurately machined reference position which provides a positional frame of reference with respect to all vessel dimensions. The use of the reactor vessel key ways permits mounting of the inspection assembly when the reactor internals are removed. When the reactor internals are in place within the reactor vessel and a partial inspection is to be carried out, the inspection assembly mounts on locating pins which extend from the reactor internals, and these locating pins then provide the positional frame of reference.

The reactor inspection assembly 17 is shown in greater detail in FIG. 2 with the flange scanner assembly and the nozzle scanner assembly mounted.

The inspection assembly 17 comprises a positioning and support assembly 20 which comprises a central body portion or weldment 21 mounted on tubular central column 22, which upon placement of the assembly 17 in the reactor vessel extends along the longitudinal axis of the reactor vessel. For nozzle scanning operations as shown in FIG. 2, the central column 22 only need extend as far as the nozzles in the vessel. A plurality of radially directed support arms 23 extend from the weldment or central body portion 21 and are pivotally connected thereto at pivot point 24. The other end 25 of the respective support arms 23 are adapted with support shoes 26 which fit the reactor vessel keys ways 18, or the locating pins of the reactor internals if in place, depending upon the vessel configuration at the time of inspection. Tie rods 27 are coupled at end 28 to central body portion 21 and at the other end 29 to the shoe 26 to assure that the seating surface of each shoe is raised and lowered in unison and that each shoe sealing surface remains parallel to each other. This insures the accuracy of the positional frame of reference of the inspection assembly relative to the vessel. All positional measurements are taken with respect to the reactor vessel key ways and the inspection assembly is accurately maintained with respect to this positional frame of reference.

Figure 3:
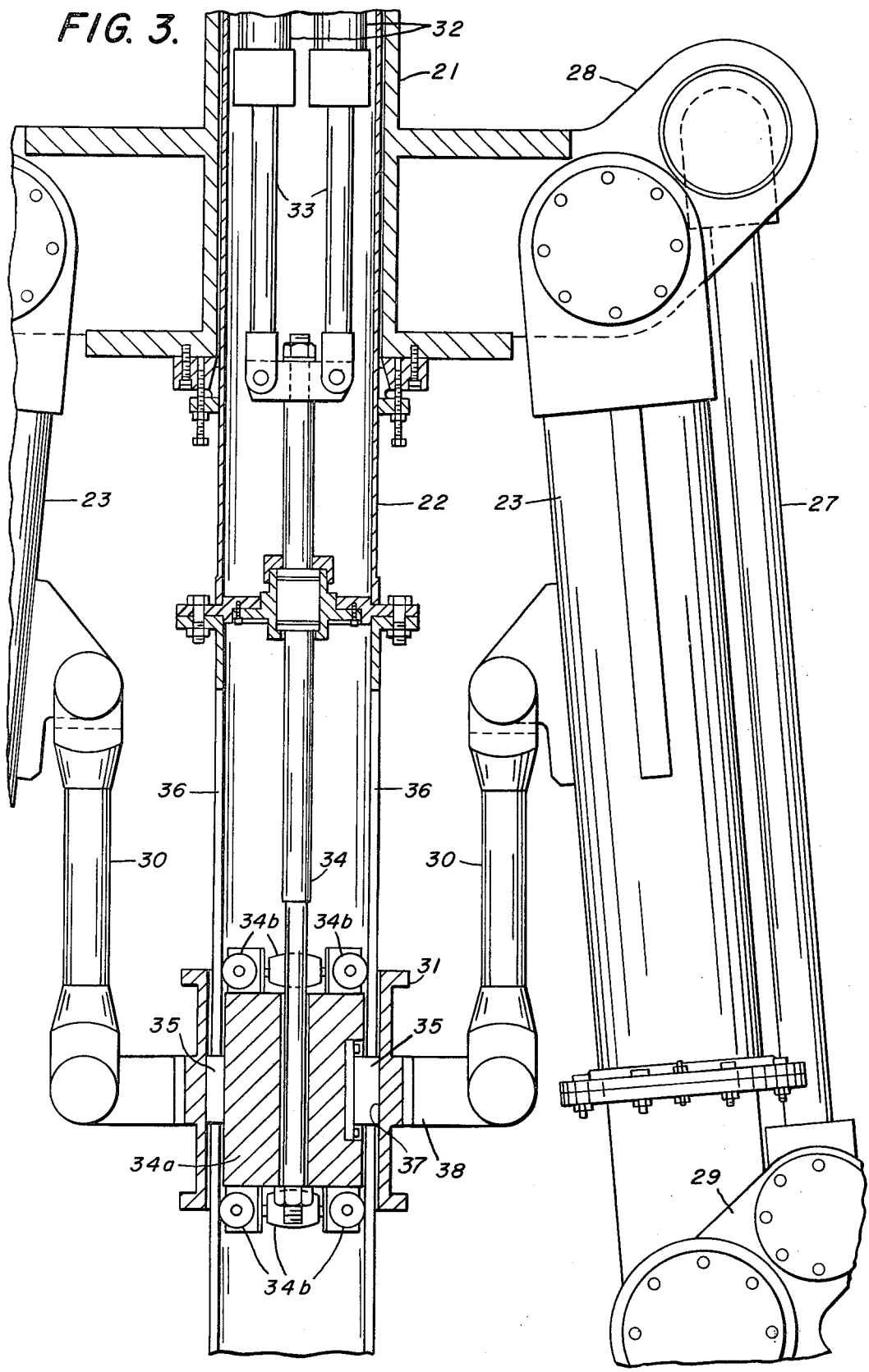
FIG. 3 is a sectional view taken through the central portion of the assembly proximate where the support arms are connected to the central body portion, and showing the adjustment means by which the support arms can be increased or decreased in radial extent.

Inspection assembly 17 is adaptable to reactor vessels of various sizes and diameters by means of the integral adjustability of the diametric extent of the support arms 23. Pivotally connected equalizer arms 30 extend from approximately the mid-points of respective support arms 23 and are pivotally connected to collar means 31 which is movably mounted upon the central column 22, as more clearly shown in FIG. 3. Support arm actuating hydraulic cylinder means 32 are disposed within the central column with the drive piston 33 and connected link 34 being connected via radially extending arms 35 which extends through slots 36 in the central column and slot 37 in collar means 31, to mounting bracket 38 to which equalizer arm 30 is connected. The mounting bracket 38 is in turn attached to collar means 31. Only two such links 35 are used to provide direct connection with two of the equalizer arms 30. The other two equalizer arms 30 are connected to the collar means 31 and are raised or lowered in unison with the other arms by this common linkage. Stabilizing barrel guide means 34a is mounted to shaft 34 and arms 35 within central column 22. The barrel guide means 34a moves within the central column 22 as rod 34 is actuated, with roller barrels 34b contacting the inside surface of central column 22.

The movable inspection assemblies include the flange scanner assembly 39, the nozzle scanner assembly 40, and the vessel shell scanner assembly 41. Rotation of the flange scanner assembly 39 relative to the central column 22 is provided by the upper carriage assembly 42. Vertical movement of the nozzle scanner 40 and vessel scanner 41 is achieved by the main carriage vertical drive 43 and the main carriage assembly 44. The main carriage assembly 44 provides the means to rotate the nozzle scanner and vessel scanner relative to the central column. The upper carriage assembly 42 is the structural equivalent of the main carriage assembly 44, except that it is mounted on the central column 22 and restrained from vertical movement.

A detailed description of specific sub-assemblies now follows.

Main carriage vertical drive

Figure 4:
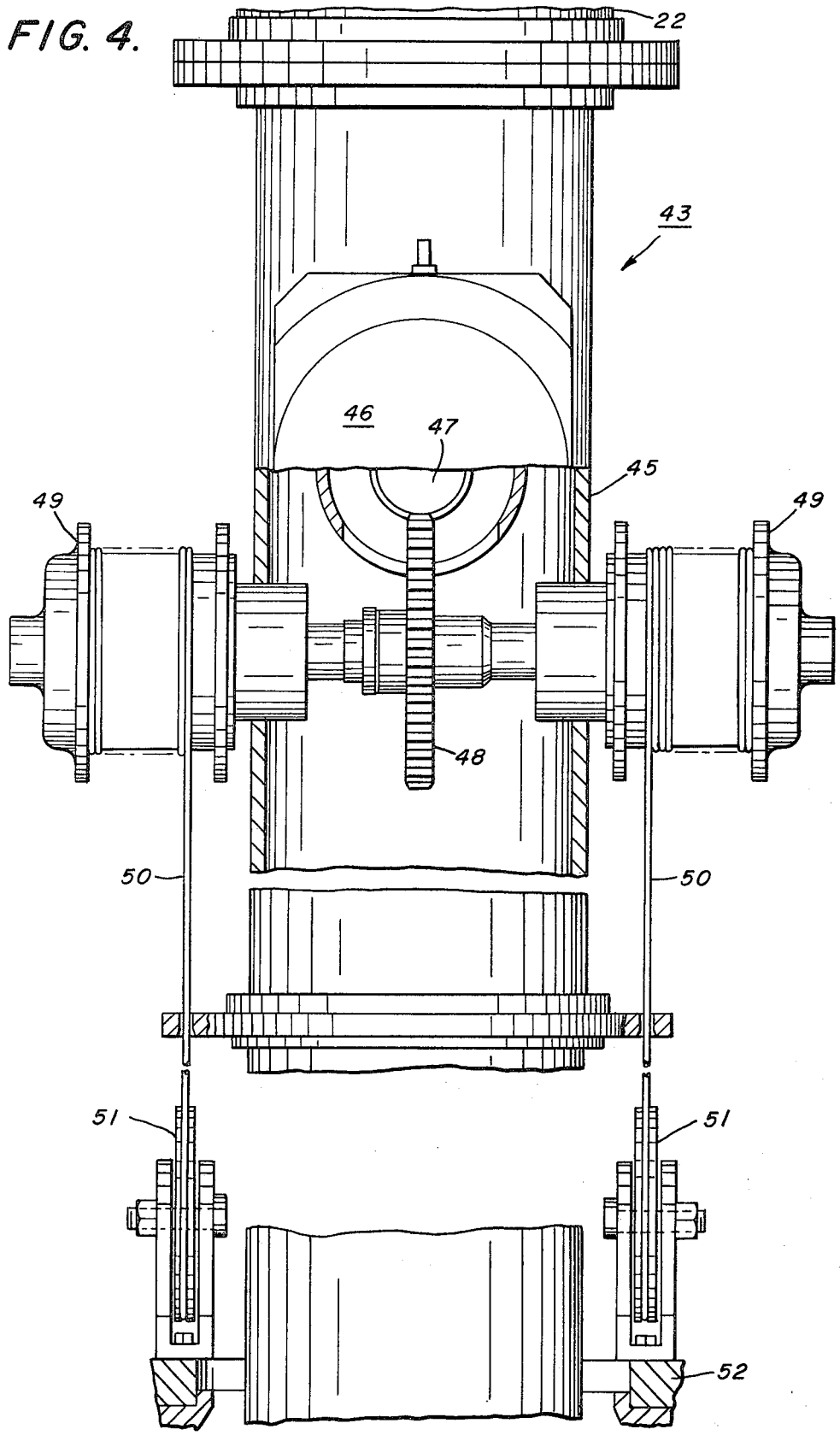
FIG. 4 is a sectional view taken through the vertical drive means portion of the central column, by which means the circumferential and longitudinal vessel scanner assembly can be raised or lowered.

The vertical movement and positioning of the nozzle scanner assembly 40 and the vessel scanner assembly 41 depending on which one is being used, is effected by the main carriage vertical drive means 43 more clearly shown in section in FIG. 4. The main carriage vertical drive means 43 comprises a generally tubular member 45 which is connected to aligned central column portions 22 which attach to either end of member 45. The main carriage vertical drive means 43 also comprises a permanent magnet torque motor 46, the shaft 47 of which is used to turn gear 48 and connected drums 49 which wind and unwind dual wire ropes 50 through pulleys 51 mounted on the main carriage assembly 44 to permit raising or lowering of the main carriage assembly 44 to provide a vertical elevation adjustment for the nozzle scanner 40 and the vessel scanner 41. The central column 22 can be adjusted in length by the connection of additional, similar, rigid tubular sections.

Main carriage assembly

Figure 5:
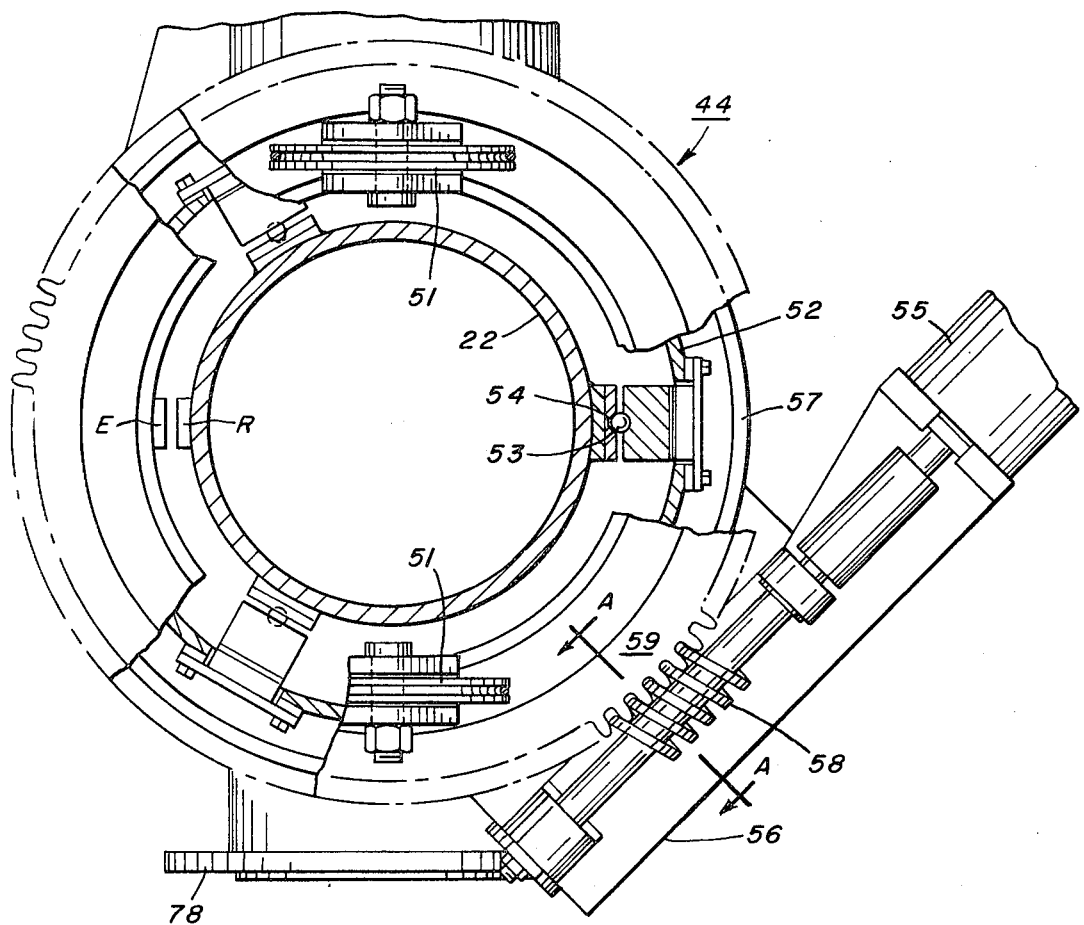
FIG. 5 is a sectional view taken through the carriage assembly and the central column to show how the scanner assemblies are rotatable about the central column.
Figure 5A:
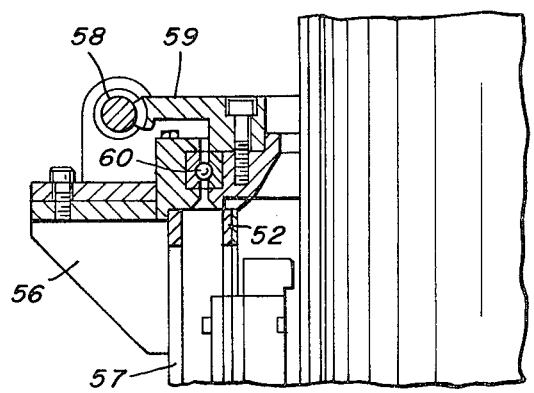
FIG. 5a is an enlarged sectional view taken along line A—A in FIG. 5.

The main carriage assembly 44 can be more clearly understood by reference to FIGS. 5 and 5a. The main carriage assembly 44 is mounted on the central column 22 and comprises an inner cylindrical shell 52 which has a plurality of vertical ball ways 53 provided therein for accurate tracking in vertical tracks or V-ways 54 provided on the central column 22. The inner shell 52 is thus restrained from rotation by the engagement of the ball ways 53 with the tracks or V-ways 54. A rack, generally indicated at R, extends vertically along the central column 22, and a position encoder E which reads the rack R is provided on the inner shell 52 opposite the rack to give a vertical position indication. The main carriage rotary electric drive 55 is supported by bracket 56 mounted on outer shell 57 of the main carriage assembly. The drive 55 turns worm 58 which is engaged with gear 59 which is a stationary gear connected to inner shell 52 as can be seen in FIGS. 5 and 5a. The worm 58 thus advances around the stationary gear 59 and thereby effects rotation of outer shell 57 with respect to the inner shell 52 and the central column 22. A bearing ring 60 is disposed between the inner shell 52 and the outer shell 57 to permit such rotation, but also to allow the inner and outer shell to be raised and lowered vertically as a unit. A fixture 61 which is adapted to clamp the nozzle scanner assembly in place below the main carriage 44 is connected to the outer shell 57 and is rotatable therewith.

Flange scanner assembly

The flange scanner assembly 39 comprises an upper carriage assembly 42 mounted about the upper portion of the central column 22. A rotary drive motor 62 is associated with the upper carriage assembly 42 to effect rotation of the upper carriage assembly 42 in the same way as just explained for the main carriage 44. A radially-directed arm 63 extends from the upper carriage assembly 42 and includes radial positioner drive means 64 which is used to drive telescoping portions 65 of the arm 63. A downwardly-directed extension 66 is connected at the extending end 67 of arm 63. The flange scanner ultrasonic transducer array 68 is disposed at the downwardly-extending end of extension 66, and permits examination of the ligament areas between the bolt holes 16 in the flange 15.

The downwardly-directed or vertical extension 66 preferably includes a telescoping tube portion 69 which is operated by pneumatically-operated cylinders, not shown, which are disposed within the extension 66. Actuation of the cylinders positions the transducer array 68 accurately above the flange 15 by means of mechanical stops 69a.

Provision of a different scanner array at the end of the flange scanner assembly 39 will permit inspection of the flange to vessel seal weld.

Nozzle scanner assembly

The nozzle scanner assembly 40 comprises a radially-extending body portion 70 which is retained by the clamping fixture 61 so that body portion 70 extends radially out from the longitudinal axis of the central column. The position at which the clamping fixture engages the body portion can be used to vary the radial extent of the assembly 40 to permit use with various vessel diameters. A telescoping tube portion 71 extends from one end of the body portion 70, and a three-pronged nozzle fitting member 72 is disposed at the extending end of the telescoping tube portion 71. The three individual arms or prongs 73 of member 72 are spring-loaded with a nozzle wall abutting ball bearing 74 and nozzle inspection ultrasonic transducer array 75 disposed at the end of each respective arm 73. A nozzle longitudinal feed electric drive 76 is used to drive a worm gear set and acme screw thread extending member which is not shown, but which is disposed within the body portion 70 and extends from the electric drive 76 to the telescoping tube portion 71 to actuate and effect extension and retraction of the telescoping tube portion when the nozzle scanner is positioned within the nozzle. The drive 76 can position the transducer array 75 at any selected position within the nozzle as far as the safe end weld inspection requires. The drive 76 has an integrally-mounted encoder for position indication as do all the electric drive means utilized in the inspection assembly 17, with the exception of the drive 46 which has an externally mounted encoder E which reads rack R. A nozzle scanner rotary electric drive 77 is mounted on the body portion 70 and is used to rotate the nozzle fitting member 72 and the supported transducer arrays 75 about the nozzle. The drive 77 is connected to a worm gear set, not shown, and an integrally-mounted encoder is associated with the drive 77 for angular position indication.

The spring-loaded arms 73 serve to accurately space the transducer arrays 75 from the nozzle inside wall and will compensate for any ovality of the nozzle. The end bearing or balls 74 facilitate rotation of the three-pronged nozzle fitting member 72. The scan is carried out by rotating member 72 one revolution at a given longitudinal position, indexing the longitudinal drive 76, and then rotating member 72 in the reverse direction, and so on.

Vessel scanner assembly

When the inspection assembly 17 is to be used to circumferentially and longitudinally scan the cylindrical vessel wall 13, the nozzle scanner assembly 40 and clamp fixture 61 are removed from the main carriage 44. The central column 22 is extended to the desired length by addition of lengths of identical tubular members which are aligned and connected together, with the main carriage 44 being movable up and down the central column 22 as already explained.

The vessel scanner assemblies 41 are connectable to mounting flanges 78 provided on the outer shell 57 of the main carriage 44. While only one such vessel scanner assemly 41 is needed, a plurality can be provided, with preferably two opposed assemblies shown in FIG. 1. The assembly 41 comprises a longitudinally-extending tubular body 79 which is mated to mounting flange 78. A telescoping tubular extension 80 is provided at the extending end of tubular body 79, with a penumatic cylinder, not shown, which is disposed within the tubular body 79 being used to actuate the tubular exension 80. A mounting plate 81 is disposed at the extending end of extension 80. The vessel wall scanner ultrasonic transducer array 82 is disposed on the mounting plate 81, and a centrally-located spring loaded roller head 83 is also provided on the mounting plate 81, with the roller head 83 making contact with the vessel wall. The roller head spaces the transducer array 82 from the vessel wall and permits ready vertical and rotary movement of the scanner assembly 41 along the vessel wall. The roller head is preferably spring-loaded to bias the assembly 41 against the vessel wall to maintain the predetermined water path spacing between the transducers and the metal wall. An electric drive means 84 for rotating the mounting plate 81 and the transducer array 82 carried thereon is mounted on the end of the telescoping extension 80. In order to get an accurate plot of suspected defects in the metal wall, it is desired to be able to vary the position of the individual transducers which makeup the array 82, and this is preferably achieved by rotating the mounting plate 81 in angular increments. The attachment of the mounting plate 81 to the end of extension 80 is preferably a sliding fit so that the mounting plate can be removed while the scanner assembly is disposed in place within the reactor vessel by means of a long rod which engages eyelet 85 provided on the mounting plate 81.

Permanent magnet electric motors are used to provide most of the basic movements of the individual elements of the tool assembly except for the adjustment of the support arms. The electric drive motors use permanent magnet torque motors having precise digital feedback capability. Once the positional frame of reference is established by the fit of the support shoes upon the reactor vessel portion being relied upon, the positive feedback control electric drive motors give very accurate positional adjustment of the transducer array with readily-adjustable speed control and accurate positional indication. An absolute optical encoder is directly coupled with each of the electric drive motors except drive 46. The operation of such optical encoders is known in the art, with the principle of operation being the alignment of successive apertures or slits giving an indication of the angular rotation of the drive shaft, to give an accurate digital positional output signal, which is also used as the positive feedback control signal for the power supply. Of course, all the motors and electric indicating means are sealed for underwater operation.

An optical encoder is likewise used for position indication signals had from the rack which extends along the vertical extent of the central column, to indicate the vertical position of the carriage assembly.

The electric drive motors are preferably powered by a flexible thyristor power supply. The output voltage of the power supply is controlled jointly by the digitally-developed error signal had from the optical encoder output and a velocity signal produced by a tachometer and amplifier. This power supply permits accurate positioning and movement of the transducer arrays at any incremental position. The scan speed of the various inspection assembles can be varied and controlled to accommodate various inspection details or precisely stopped where desired.

The information generated relative to the state of the weld areas can be monitored visually on appropriate display systems or recorded for comparison with earlier or later inspections of the same precise area.

The basic tool assembly can be utilized not only as an ultrasonic inspection system, but also with other testing or inspection sytsems disposed at the ends of the flange nozzle, and vessel scanner assemblies.

A gamma scan device can be affixed to any of the scanner assemblies or an underwater television camera can be used for a precise visual examination of a given area. The tool assembly is easily adaptable for disposing grinding and welding equipment at a precise position within the reactor vessel for repair work.

Spacer elements can be provided for each of the radially-extending portions of the various scanner assemblies as well as for the basic support arm structure to permit the inspection assembly to be used with reactor vessels of widely varying diameters.

The inspection assembly of the present invention can be utilized with or without the reactor internals in place in the vessel. When the reactor internals are in place in the lower portion of the vessel, the seating shoe at the end of the support arms is designed to seat on the internal guide pins to permit partial inspection with the internals in place.

Dynamic stability and great positional accuracy is achieved with the device of the present invention because the basic support structure is rigid, and by avoiding rotation of large masses over great distances. Thus, the central column which can extend on the order of thirty feet or more is not rotated.

The inspection assembly can be moved into position by means of an overhead crane after the reactor vessel header is removed. When the assembly seats on the vessel, the overhead crane can be dispensed with.

Positioning indicating means are provided for all the moving parts of the inspection assembly, so that the position of the inspection tool, such as the ultrasonic transducer array, is accurately known and controlled. The basic reference point from which all positional measurements are taken is the vessel key ways or other vessel portion upon which the support arms shoes seat. This positions the central column along the longitudinal axis of the reactor vessel. The vertical zero frame of reference of the vessel is translated to the central column by the mechanical linkage of the adjustment arms.

What is claimed is:

1. A nuclear reactor vessel in-service inspection assembly for remotely, accurately positioning a tool within the reactor vessel comprising:

a positioning and support assembly comprising a central body portion from which a plurality of radially directed support arms extend, with the extending ends of said support arms seating on a predetermined portion of the reactor vessel substantially proximate the reactor vessel flange to define a positional frame of reference for the inspection assembly relative to the reactor vessel;

a central column connected to the positioning and support assembly and extending along the longitudinal axis thereof; and movable inspection assemblies connectable to the central column including drive means and position indicating means therefor.

2. The assembly specified in claim 1, wherein the positioning and support assembly comprises:

a head weldment which is fitted about the central column assembly;

said plurality of support arms being pivotally connected at one end thereof to the head weldment, with the other end of each support arm being adapted to seat on a predetermined portion of the reactor vessel to define a positional frame of reference for the inspection assembly relative to the reactor vessel; and a support arm actuator means for simultaneously moving the support arms, including a collar movably mounted about the central column assembly, and the collar is connected to means for moving the collar up and down the central column assembly, and tie rods extending out from said collar to respective support arms at a point intermediate the ends of the support arms, whereby raising or lowering of the collar on the central column respectively increases or decreases the radial extension of the seating end of the support arms from the central column.

3. The assembly specified in claim 2, wherein the central column is tubular and the means for actuating raising or lowering the collar is disposed within the central column with connecting links extending through slots provided in the central column wall and connected to the collar.

4. The assembly specified in claim 2, wherein the seating ends of the support arms are adaped to seat the key ways provided in the reactor vessel internals support flange.

5. The assembly specified in claim 2, wherein the seating ends of the support arms are adapted to seat the guide pins of the reactor internals to permit partial inspection of the reactor vessel with the reactor internals in place.

6. The assembly specified in claim 1, wherein the inspection assemblies include ultrasonic inspection means.

7. The assembly specified in claim 6, wherein a flange scanner assembly comprises the movable inspection assembly and comprises:

an upper carriage assembly fitted about the central column above the positioning and support assembly, which upper carriage assembly includes an outer portion which is rotatable about the central column, at least one radially directed arm extends from the upper carriage assembly, with the extending end having a downwardly directed extension, which extension is parallel to the longitudinal axis of the central column, and wherein an ultransonic transducer array is disposed at the extension end portion whereby the transducer array is passed over the main flange of the reactor when the carriage assembly is rotated to permit inspection of the ligaments between the threaded stud holes provided in the flange.

8. The assembly specified in claim 7, wherein the radial arm and the downwardly directed extension include telescoping portions.

9. The assembly specified in claim 7, wherein the radially directed arm includes a telescoping portion and drive means therefore for extending or retracting said arm whereby the flange scanner can be adapted for use with reactor vessel flanges of varying diameters.

10. The assembly specified in claim 7, wherein the downwardly directed extension includes a telescoping portion and drive means therefore to permit accurate spacing of the transducer array above the flange face.

11. The assembly specified in claim 6, wherein a nozzle scanner assembly comprises the movable inspection assembly and comprises; a central column fitting main carriage assembly with a rotatable outer portion to which a longitudinally extending, radially directed member is connected, which radially directed member includes a telscoping portion and drive means therefore, a rotary drive means and associated angular position indicating means are also provided for the extending end of the radially directed member.

12. The nozzle scanner assembly specified in claim 11, wherein a plurality of nozzle fitting prongs extend from the extending end of the radially directed member in directions normal to the radially directed member, with the ultrasonic transducer arrays being disposed at the end of each such prong.

13. The nozzle scanner assembly specified in claim 12, wherein the extending prongs are extendable and retractable to fit nozzles of varying diameter.

14. The assembly specified in claim 6, wherein a vessel scanner assembly for circumferentially and longitudinally inspecting the vessel comprises the movable inspection assembly and comprises; a central column fitting main carriage assembly including a rotatable outer portion to which at least one longitudinally extending, radially directed member is connected which radially directed member includes a telescoping portion and drive means threefore.

15. The assembly specified in claim 14, wherein an ultrasonic transducer array is disposed on a mounting plate slidably mounted on the extending end of the radially directed member, which mounting plate is removable by remote means when the vessel scanner assembly is disposed within the reactor vessel.

16. The assembly specified in claim 15, wherein the ultrasonic transducer array is rotatable to permit scanning of a particular vessel area from various positions.

17. The assembly specified in claim 14, wherein the main carriage assembly of the vessel scanner assembly is connected to vertical drive means connected to the central column whereby the main carriage assembly can be raised and lowered on the central column.

18. The assembly specified in claim 17, wherein the vertical drive means comprises a permanent magnet electric motor, the shaft of which is adapted by a worm-gear set to turn a drum upon which wire rope support means is reeled, with the wire rope being connected via a pulley to the main carriage assembly to permit raising and lowering of the main carriage assembly.

19. The assembly specified in claim 1, wherein said positioning and support assembly includes integral adjustment means whereby the radial extent of the support arms is simultaneously varied to permit the assembly to fit reactor vessels of varying diameter.

20. The assembly specified in claim 1, wherein the position indication means is responsive to the location of the movable inspection assemblies relative to the positional frame of reference to provide an output indicative thereof.

References Cited

UNITED STATES PATENTS

| | | | |
|---|---|---|---|
| 3,664,922 | 5/1972 | Diwinsky et al. | 176—19 R |
| 3,602,036 | 8/1971 | Peterson et al. | 73—71.5 U |
| 3,584,504 | 6/1971 | Proctor et al. | 73—67.8 |
| 3,382,707 | 5/1968 | Heselwood | 73—71.5 U |

OTHER REFERENCES

Materials Evaluation, July 1970, vol. 28 (No. 7), pp. 162–166.

REUBEN EPSTEIN, Primary Examiner

U.S. Cl. X.R.

73—67.8